Dec. 13, 1927.
W. C. BUSH
ANIMAL TRAP
Filed June 6, 1927
1,652,606
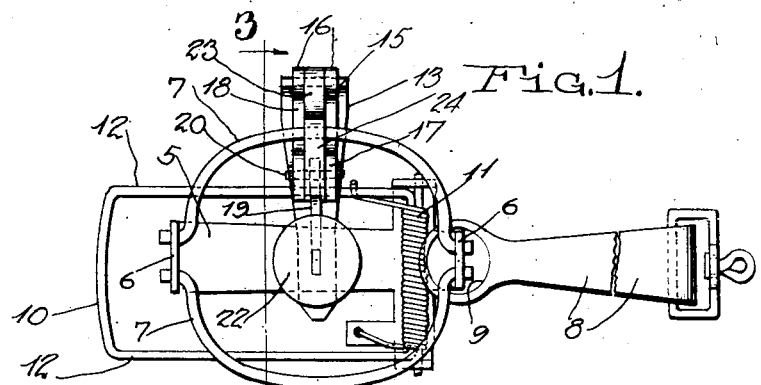
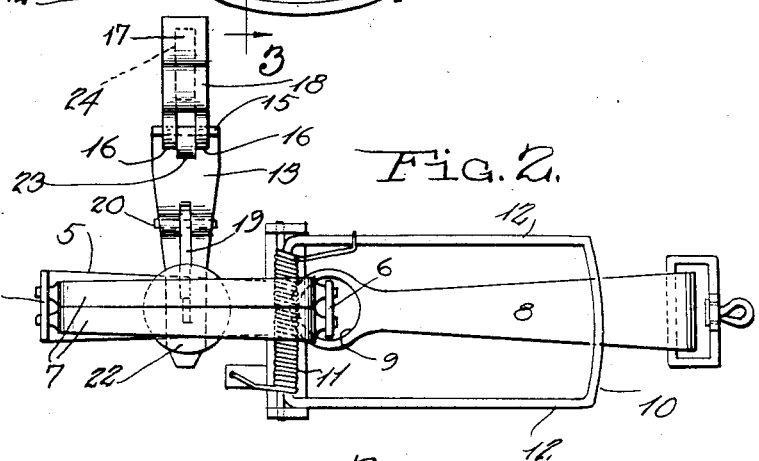
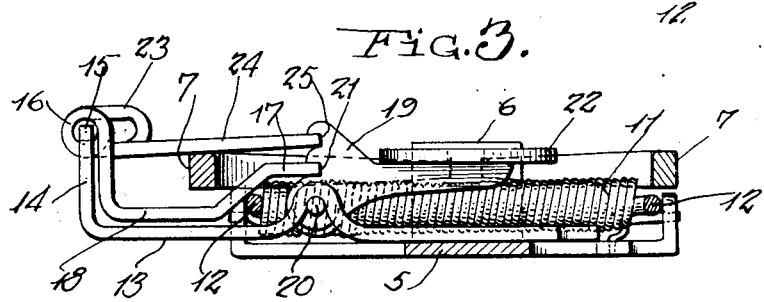
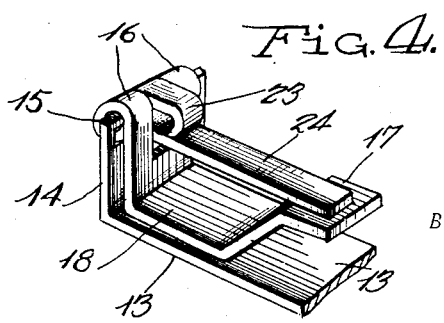
INVENTOR.
W. C. Bush.
BY
F. A. Bryant,
ATTORNEY.

Patented Dec. 13, 1927.

1,652,606

UNITED STATES PATENT OFFICE.

WELLINGTON C. BUSH, OF PORT BYRON, NEW YORK.

ANIMAL TRAP.

Application filed June 6, 1927. Serial No. 196,761.

This invention relates to animal traps, and has more particular reference to jaw traps of the type shown in the U. S. Patent to Harmon Thompson, No. 1,404,070, January 17, 1922, wherein a third or supplemental jaw is provided to engage the body of the animal, in addition to the usual pair of cooperating jaws.

While traps of the above kind have been found quite efficient in operation, they have been found more or less dangerous to the trapper, when setting the same, due to the lack of trigger mechanism for holding the third or supplemental jaw in set position preparatory to setting the main jaws of the trap.

It is the primary object of the present invention, therefore, to provide an improved form of trigger and release mechanism for traps of the above kind embodying means including a trigger for holding the third or supplemental jaw in set position preparatory to setting the usual pair of main jaws.

A more specific object is to further provide means including a second trigger readily engageable with the holding and releasing treadle without releasing the trigger for the third or supplemental jaw, for facilitating setting of the main pair of cooperating jaws, thereby enabling setting of the trap with complete safety in an expeditious manner.

Other objects will become apparent as the nature of the invention is better understood, and the same consists in the novel form, combination and arrangement of parts hereinafter more fully described, shown in the accompanying drawing, and claimed.

In the drawing, wherein like reference characters indicate corresponding parts throughout the several views, Figure 1 is a top plan view of a three-jaw trap provided with a trigger setting and releasing mechanism in accordance with the present invention, the jaws being in set position;

Figure 2 is a view similar to Figure 1 with the jaws in released position;

Figure 3 is an enlarged transverse section on line 3—3 of Figure 1; and

Figure 4 is an enlarged fragmentary perspective view showing the triggers and the manner of mounting the same.

Referring more in detail to the drawing, 5 indicates the base member of the trap having upturned ends 6 in which the ends of the main cooperating pair of jaws 7 are journaled, and 8 indicates the usual return bent leaf spring employed for forcibly swinging the jaws 7 upwardly and inwardly toward each other, the inner ends of the spring 8 being apertured in the usual way as at 9 to receive and pass over one of the upturned ends 6 of the base member 5 and the adjacent ends of the jaws 7. The construction thus far described is well known in the art, and as its operation is well understood, further comment thereon is deemed unnecessary.

As disclosed in the above mentioned patent these jaw traps have been provided with a third or supplemental loop or jaw 10 actuated by a spring 11 to swing upwardly and toward the spring 8 for gripping the body of the animal when the jaws 7 are released, the jaw 10 swinging upon an axis at right angles to the axis of the main jaws 7 and being so located as to have the legs 12 thereof extend beneath the main jaws 7 when in set position. Heretofore, it has been proposed to retain the main jaws 7 in outwardly and downwardly swung set position by means of a single trigger engageable with a bait plate carrying treadle, the trigger overlying one of the main jaws of the trap, and the third or supplemental jaw 11 simply being held in set position by the main jaws 7 overlying the same.

In accordance with the present invention, a lateral bar 13 is carried by the base member 5 and has an upturned end portion 14 whose upper free end is formed with a horizontal elongated slot to define a cross-bar as at 15 upon the end portions of which are pivoted the legs 16 of the outer bifurcated end portion of a trigger 17 whose intermediate portion 18 is downwardly offset to readily clear and pass beneath the adjacent main jaw 7 when the latter is in outwardly and downwardly swung set position as shown clearly in Figure 3, the inner end portion of the trigger 17 being properly shaped however to pass upwardly over the adjacent leg 12 of the body engaging jaw 10 as is also shown clearly in Figure 3. A treadle 19 is pivoted as at 20 to the bar 13 and has a notch 21 engageable with the free inner end of the trigger 17 for holding the same against swinging upwardly and outwardly and thereby retaining the body engaging jaw 10 in set position. The treadle 19 is provided with the usual form of bait plate 22 adapted to be depressed so as to disengage the treadle 19 from the trigger 17 to release the jaw 10.

Pivotally mounted and longitudinally slidable upon the intermediate portion of the cross-bar 15 between the legs 16 of trigger 17, is the longitudinally elongated eye member 23 provided upon the outer end of a further trigger 24 which is adapted to extend inwardly across the adjacent main jaw 7, and provided in the treadle 19 above the notch 21 is a further notch 25 adapted to receive the free inner end of the trigger 24 to hold the latter against swinging upwardly and outwardly and to thereby retain the main jaws 7 in set position. The trigger 24 is allowed considerable sliding movement on the cross-bar 15 so that it may be left out of the way when engaging the trigger 17 with the treadle 19, and then subsequently brought into operative position and engaged with the treadle 19 without effecting release of trigger 17 from treadle 19. Naturally, the elongated eye 23, therefore, presents considerably more than a loose mounting of the trigger 24 on the cross bar 15 as has been the usual practice in connection with jaw traps.

From the foregoing description it will be readily seen that the body engaging jaw 10 may be first set and held in set position by the trigger 17 engaged with the treadle 19, whereupon the trigger 24 may be placed to overlie the main jaws 7 and engaged with the treadle 19 to hold the latter jaws in set position, without effecting release of the trigger 17 from the treadle 19, thereby permitting setting of the trap with facility and ease and eliminating the hazard heretofore encountered in setting traps of this character.

In operation, depression of the plate 23 will effect tilting of the treadle 19 so as to simultaneously disengage from both of the triggers 24 and 17, and permitting immediate functioning of the springs 8 and 11 in swinging the main jaws 7 and supplemental jaw 10 to trapping position as is clearly explained as to general operation in the above mentioned patent.

It will be seen that traps of the kind referred to may be cheaply and easily equipped with triggers and treadles constructed in accordance with the present invention at a comparatively low cost, and yet efficient means will be proveded for eliminating the hazard referred to above.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. In an animal trap, the combination with a pair of cooperating spring-actuated main jaws, and a supplemental animal body-engaging spring-actuated loop adapted to be set beneath the main jaws when the latter are set, of a treadle, a trigger adapted to be positioned to extend beneath one of the main jaws and over the adjacent portion of said loop for releasable engagement with the treadle to retain said loop in set position, and a second trigger adapted to be positioned to extend over one of the main jaws for releasable engagement with said treadle to retain the main jaws in set position, said treadle having spaced superposed notches for reception of the inner free ends of the respective triggers.

2. In a three-jaw trap, a treadle having a pair of notches, a trigger adapted to overlie one jaw and engage in one notch to retain said one jaw set, and a second trigger adapted to overlie another jaw and engageable in the other notch while the first trigger is operative to retain said other jaw and the remaining jaw in set position.

3. In a three-jaw trap, a treadle having a pair of notches, a trigger adapted to overlie one jaw and engage in one notch to retain said one jaw set, a second trigger adapted to overlie another jaw and engageable in the other notch while the first trigger is operative to retain said other jaw and the remaining jaw in set position, and a support on which the first named trigger is pivoted, the second named trigger being pivotally and slidably mounted on said support.

4. In a three-jaw trap, a treadle having a pair of notches, a trigger adapted to overlie one jaw and engage in one notch to retain said one jaw set, a second trigger adapted to overlie another jaw and engageable in the other notch while the first trigger is operative to retain said other jaw and the remaining jaw in set position, a support on which the first named trigger is pivoted, the second named trigger being pivotally and slidably mounted on said support, said first named trigger having a bifurcated end pivoted on said support, and said second named trigger being mounted on the support between the bifurcations of the first named trigger.

5. In an animal trap, the combination with a pair of cooperating spring-actuated main jaws, and a supplemental animal body-engaging spring-actuated loop adapted to be set beneath the main jaws when the latter are set, of a treadle, a trigger adapted to be positioned to extend beneath one of the main jaws and over the adjacent portion of said loop for releasable engagement with the treadle to retain said loop in set position, a second trigger adapted to be positioned to extend over one of the main jaws for releasable engagement with said treadle to retain the main jaws in set position, and a support on which both of said triggers are mounted.

6. In an animal trap, the combination with a pair of cooperating spring-actuated main jaws, and a supplemental animal body-engaging spring-actuated loop adapted to be set beneath the main jaws when the latter are set, of a treadle, a trigger adapted to be positioned to extend beneath one of the main jaws and over the adjacent portion of said loop for releasable engagement with the treadle to retain said loop in set position, a second trigger adapted to be positioned to extend over one of the main jaws for releasable engagement with said treadle to retain the main jaws in set position, and a support on which both of said triggers are mounted, said first named trigger having a depressed intermediate portion adapted to underlie said main jaw.

7. In an animal trap, the combination with a pair of cooperating spring-actuated main jaws, and a supplemental animal body-engaging spring-actuated loop adapted to be set beneath the main jaws when the latter are set, of a treadle, a trigger adapted to be positioned to extend beneath one of the main jaws and over the adjacent portion of said loop for releasable engagement with the treadle to retain said loop in set position, a second trigger adapted to be positioned to extend over one of the main jaws for releasable engagement with said treadle to retain the main jaws in set position, and a support on which both of said triggers are mounted, said second named trigger being pivotally and slidably mounted on said support.

In testimony whereof I affix my signature.

WELLINGTON C. BUSH.